United States Patent Office 3,253,878
Patented May 31, 1966

3,253,878
PROCESSES FOR DYEING AND PADDING OF
HYDROPHOBIC MATERIALS
Winfried Kruckenberg, Leverkusen, Detlef Delfs, Opladen, and Max Schwarz, Leverkusen, Germany, assignors to Farbenfabriken Bayer Aktiengesellschaft, Leverkusen, Germany, a German corporation
No Drawing. Filed July 24, 1963, Ser. No. 297,208
Claims priority, application Germany, July 31, 1962,
F 37,466
17 Claims. (Cl. 8—55)

The invention is concerned with a process for the dyeing and padding of hydropholic materials.

It was found that on structures such as filaments, fibres, foils, ribbons, fabrics and the like made from hydrophobic materials, such as aromatic polyesters, for example polyethylene terephthalates or polyesters from terephthalic acid and 1,4-bis-hydroxymethyl cyclohexane, synthetic polyamides and polyurethanes, polyvinyl chlorides, polyacrylonitrile and its mixed polymerisates, cellulose esters and polyolefines, such as polyethylenes and polypropylenes, valuable dyeings can be produced if the dyeing materials are treated, in any desired order, consecutively with ($\alpha$) reaction products of aromatic amines with aliphatic aldehydes containing at least one water-solubilizing group and/or condensation products of said aromatic amines with reaction products of alkali metal bisulfite and alpihatic aldehydes, and with ($\beta$) (a) quinones or (b) N-halogenoquinone imines or N,N'-dihalogeno-quinone diimines of optionally substituted quinones, or (c) with cyclohexenone and cyclohexadienone compounds of the formulae

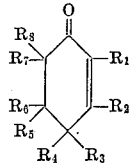 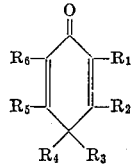

wherein $R_1$ to $R_8$ denote hydrogen, halogen, alkyl, aralkyl or aryl radicals, and wherein adjacent radicals may be connected with each other.

Instead of the components (a), (b) or (c), quinone-anil-N-halogeno imides (d) can also be used, if desired in admixture with (a), (b) or (c).

According to the above mentioned new processes mostly dark coloured, especially black dyeings are obtained which are distinguished by good general fastness properties, particularly very good fastness to sublimation and light. Of special interest are the processes for dyeing aromatic polyesters, i.e. polyethylene terephthalates and polyesters prepared from terephthalic acid and 1,4-bis-hydroxy-cyclohexane.

The amine-aldehyde reaction products ($\alpha$) to be used according to the process can be obtained, for example, by condensation of the amines described below with the aldehydes and aldehyde reaction products mentioned below.

Amines:
4-amino-diphenylamine,
4-amino-4'-methoxy-or 2'-methoxy-diphenylamine,
1,8-diamino-naphthalene,
1-amino-4-phenylaminonaphthalene,
Benzidine,
4-aminonaphthalene-1,1'-azo-4'-aminobenzene,
4,4'-diamino-azobenzene,
3-methoxy-4-aminodiphenylamine,
4-amino-4'-naphthyl-diphenylamine,
4-amino-4'-cyclohexyl-diphenylamine,
4-amino-4'methyl-diphenylamine,
2,4-diamino-diphenylamine,
Dianisidine,
p-Aminophenyl-aminodiphenylamine,
p-Amino-phenylamino-diphenyloxide,
m-Phenylene diamine,
4-amino - 2-chloro-4'-(N-dihydroxyethyl) - amino-1,1'-azo-benzene,
4-benzoylamino - 2,5-dimethoxy - 1-amino-benzene, furthermore
4,4'-diaminostilbene, bis-(p-aminophenyl) - 4,4'-diamino-diphenylamine, bis-(p-aminophenyl) - 4,4'-diamino-diphenyloxide,
Bis-(p-aminophenyl)-4,4'-diamino-diphenylmethane,
Bis-(p-aminophenyl)-4,4'-diaminostilbene,
Bis-(p-aminophenyl) - 4,4'-diamino - 3,3'-dimethoxy-diphenyl,
4-amino-3-methoxy-4'-methyl-diphenylamine,
4-amino-2,4'-dichloro-diphenylamine,
4-amino-4'-fluoro-diphenylamine,
4-amino-3'-methyl-diphenylamine,
4-amino - 4'-trifluoromethyl-diphenylamine, 4-amino-4'-carbomethoxy-diphenylamine,
4-amino-4'-carbophenoxy-diphenylamine,
4-amino-4'-phenoxy-diphenylamine,
4-amino-4'hydroxydiphenylamine,
4-ethylamino-4'-methoxy-diphenylamine,
N,N'-bis-(4'-aminophenyl)-1,5-naphthylene diamine,
4-amino-4'-hydroxybenzoyl-diphenylamine.

Examples of aliphatic aldehydes which contain at least one water-solubilising group, are glycerol aldehyde, arabinose, glucose and glyoxalic acid; suitable reaction products of alkali metal bisulphite with aliphatic aldehydes are e.g. the reaction products of sodium or potassium bissulphite with formaldehyde, acetaldehyde, crotonaldehyde and glyoxalic acid.

For the further treatment of the hydrophobic materials the following quinones of the class of compounds (a) are suitable, for example: benzoquinone-(1,4), naphthoquinone-(1,4), 2,5-dichloro-benzoquinone-(1,4), 2,3,5,6-tetrachloro-benzo-quinone-(1,4), 1,2-benzo- or -naphthoquinone or their derivatives, 2,6-dichloro-benzoquinone, 2,3,6-trichloro-benzoquinone or the corresponding bromine derivatives, 2-phenyl-1,4-benzoquinone or its substitution products or any mixtures of these products.

As N-chloroquinone imines or N,N'-dichloro-quinone diimines [component (b)] to be used instead of the component (a) it is advantageous to use, besides the unsubstituted chloro-imines, such mono- or dichloro-diimines which are further substituted in the quinoid nucleus, for example by halogen, such as chloro- or bromo-, alkyl or alkoxy groups. Components (b) which are particularly suitable are for example 2,6-dichloro-4-mono- or -1,4-dichlorimino-p-benzoquinone of the formula

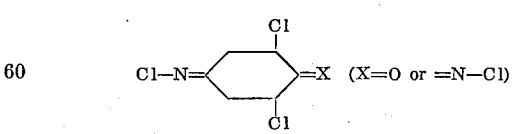

furthermore 2,5-dichloro-N,N'-dichloro-p-benzoquinone diimine, 2-methyl-N,N'-dichloro-p-benzoquinone diimine or naphthoquinone-1,4-dichloro-diimine, 1,4-N,N'-dichloroimino - p - benzoquinone - (1,4-dichloro-benzoquinone-diimine).

Mixtures of such N-halogeno-imines of the quinones or mixtures of such compounds with optionally substituted benzo- or naphthoquinoes [component (a)] can also be used with satisfactory results.

Suitable compounds of the group (c) of the formulae

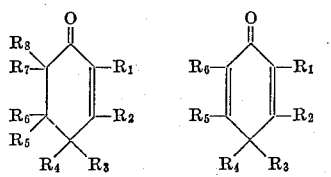

wherein $R_1$ to $R_8$ denote hydrogen, halogen, alkyl, aralkyl or aryl radicals, and wherein adjacent radicals may be connected with each other, which can be used instead of or, in some cases, in admixture with compounds of the group (a) or (b) are, among others, cyclohexenone, cyclohexanedienone, heptachloro-cyclohexenone, pentachloro-tetralone, hexachloro-cycylohexadienone and the compounds

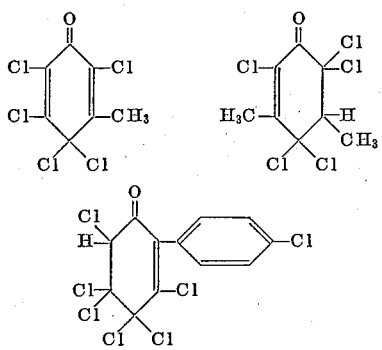

As compounds (d) can be used, inter alia, quinone-anil-N-chloro- or -bromamide or 2,5-dichloroquinone-anil-N-chlorimide.

In detail, the processes using the components (a), (b), (c) or (d) are carried out in such a way that the amide-aldehyde reaction products of the above mentioned composition and the compounds (a), (b), (c) or (d) are applied to the materials to be treated, for example fibres or fabrics, from neutral, acid or alkaline aqueous suspensions or solutions one after the other and in any order, preferably using dispersing agents or emulsifiers, from a dyeing bath or a padding liquor. According to the type of dyeing material the components are applied to the material at room temperature or at an elevated temperature, and the temperature is raised during the dyeing process, the optimum temperature being up to 140° C. At temperatures up to 100° C. it is sometimes advantageous to add customary carrier substances, such as trichlorobenzene, diphenyl, diphenyl ether or esters of aromatic carboxylic acids, to the dye bath. The procedure can, for example, be such that the dyeing material, for example fabrics or fibres of polyethylene terephthalate, is first introduced at room temperature into a dye bath or treated with a padding liquor containing, besides the amine-aldehyde reaction products ($\alpha$) of the specified type, emulsifiers or dispersing agents and, if desired, reducing agents; treatment is then continued at a slowly rising temperature, according to the type of the material to be treated, preferably at 70–140° C., until a sufficient quantity has been absorbed. It is advisable to interrupt the dyeing process at this stage; the treated material is rinsed, if desired dried intermediately, and subsequently introduced into a fresh bath containing the components (a), (b), (c) or (d) in the form of an aqueous solution or dispersion. Introduction into this second bath takes place at room temperature or a slightly elevated temperature and dyeing is continued until the optimum depth of colour has been achieved, if desired with a rise of temperature to for example 140° C. The components can sometimes be applied, with good result, in the reversed order, by applying suitable components (a), (b), (c) or (d) or mixtures of such components from a dye bath or on a padding device to the material to be treated while raising the temperature, according to the type of material and the type of starting component employed, to up to 140° C., then subjecting the treated material, if desired, to intermediate drying at a higher temperature, and subsequently treating it in a new bath with the amine-aldehyde reaction product ($\alpha$), if desired together with reducing agents, preferably while raising the temperature to up to 140° C. The rubbing fastness of the dyeings thus obtainable can be improved by aftertreatment with reducing agents such as sulphites or formaldehyde/sulphite addition products, frequently with the addition of an emulsifier. The preferred method, however, is first to apply the compound ($\alpha$) and then the compound ($\beta$).

It will be understood that dependent on the type of fibre and the reaction conditions further assistants, auxiliaries etc. may be used in the above mentioned processes, such as, for instance, urea, thiourea, melamine, phenols, phenol carboxylic acids, phenol sulphonic acids and copper salts or copper complexes; the addition of copper compounds is particularly advantageous for the dyeing of cellulose-triacetate fibres and fabrics.

As dispersing agents or emulsifiers which are added with advantage to the starting components or in the course of the dyeing processes described above the usual commercial products are suitable, such as waste liquor products of sulphite cellulose, condensation products of higher alcohols and ethylene oxide, soaps, polyglycol ethers of fatty acid amides, condensation products of aromatic sulphonic acids or mixtures of these compounds.

As reducing agents to be added, if desired, to the azomethine component the following are suitable, inter alia: sodium sulphide, sodium sulphite, sodium dithionite, sodium thiosulphate, hydroxylamine, hydrazine hydrate, sodium boranate, or mixtures of these compounds.

The dyeings obtained according to the new processes are distinguished by very good fastness properties such as fastness to wet processing, for example fastness to washing, rubbing, overdyeing and particularly also by excellent fastness to sublimation, ironing and very good fastness to light. Specially noteworthy are the fast black shades which are obtained on materials of aromatic polyesters, especially those made from fibres and fabrics of polyethylene terephthalates and condensation products of terephthalic acid and 1,4-bis-hydroxymethyl cyclohexane, which are, inter alia, used as textiles.

It is already known from U.S. patent specification No. 3,036,875 that fast black dyeings on polyester materials can be obtained by applying aromatic mono- or polynuclear black bases which are suitable for oxidative dyeing to the materials and subsequently oxidising with chlorite in the presence of an acid or with hypohalogenous acids or certain hypohalogenous acid-yielding agents, for example with N-chloro- or N-bromo carbamic acid ethyl ester, N-halogen compounds, preferably of cyclic imides, such as N-bromo-succinimide, but especially N-halogen compounds of sulphonamides, preferably those of the aromatic series, such as benzene-sulphodichloramide, p-chlorobenzene-dichloramide and p-toluene-sulphochloramide sodium salt. These processes have the disadvantage that it is necessary to use chlorine-yielding agents, which, moreover, tend to hydrolyse already at room temperature by the action of moisture and thus render questionable a level appearance of the dyeings. Furthermore, according to this method of procedure the amines are introduced in the form of aqueous dispersions which are known to be sensitive to oxidation and tend to form precipitations.

The new process obviates these disadvantages and offers better possibilities of application because of an improved durability of the starting components and the water-solubility of the azomethine components. The quinones and the derivatives of the quinones and N,N'-dihalogeno-quinone-imines, which can be used in the present new processes are stable compounds, which can, for example, withstand boiling for half an hour in an aqueous medium—corresponding to customary dyeing conditions—without being changed.

The following examples are given for the purpose of illustrating the invention without, however, limiting it thereto.

*Example 1*

6.5 grams of the reaction product obtained by heating 4-amino-diphenylamine with the reaction product of sodium bisulphite with formaldehyde in an aqueous medium, having the formula

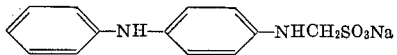

are dissolved in 150 ml. of cold water containing 0.3 gram of a weakly cation-active alkylphenyl-ammonium sulphate, and introduced into a dye bath of 1 litre of water containing 2 grams of thiourea or 0.3 gram of sodium sulphide or a mixture of 2.5 grams of sodium sulphite and 0.3 gram of sodium sulphide, and furthermore 5 grams of trichlorobenzene. After entering a hank of 50 grams of polyethylene glycol terephthalate fibre or as piece goods, the dye bath is heated to boiling temperature in the course of about 15 to 20 minutes. After a dyeing time of one hour at this temperature the goods are well rinsed and after-treated for 30 minutes at boiling temperature in a fresh bath which contains per 1 litre of water 3.5 grams of benzoquinone-dichlorodiimide-(1,4) and 2 grams of a non-ionic alkyl-polyglycol ether.

To improve the fastness to rubbing, the material can, after rinsing, be after-treated for 10–30 minutes at 70° C. in a gently boiling bath which contains per litre 4 ml. of caustic soda (38° Bé.), 2 grams of sodium bisulphite and 1 gram of a polyglycol ether of a fatty acid amine.

A black dyeing is obtained with very good fastness properties.

*Example 2*

7 grams of the reaction product obtained by heating 4-amino-4'-methoxy-diphenylamine with the reaction product of sodium bisulphite with crotonaldehyde in an aqueous medium, are dissolved in 150 ml. of cold water, which contains 0.3 gram of a weakly cation-active alkylphenyl-ammonium sulponate, and introduced into a dye bath of 1 litre of water, which contains 5 grams of trichlorobenzene. After entering 100 grams of polyethylene glycol terephthalate fibre, the procedure of Example 1 is followed. A black dyeing is then likewise obtained with very good fastness properties.

A dyeing of equal good properties is obtained if in this example a reaction product of 4-amino-3-methoxy-diphenylamine, sodium bisulphite and glyoxal is used instead of the above mentioned amino-diphenylamine reaction product.

*Example 3*

By proceeding as described in Example 1, but with the difference that instead of 6.5 grams of the reaction product therein referred to, 8 grams of the reaction product are used which is obtained by melting 4-amino-4'-methyl-diphenylamine with glucose and which corresponds to the formula

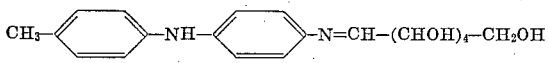

and instead of 2 grams of thiourea, 5 grams of the sodium salt of phenolsulphonic acid-(3) are used.

The black dyeing obtained possesses likewise very good fastness properties.

*Example 4*

0.6 gram of the reaction product which is obtained by heating 4-amino-diphenylamine with the reaction product of sodium bisulphite and with formaldehyde in an aqueous medium, are dissolved at 80° C. in 10 ml. of hot water and immediately added to 100 ml. of 40° C. warm water. After the addition of 10 grams of a cellulose acetate fabric the dye bath is slowly heated to 70° C. Dyeing is continued for one hour at this temperature and the fabric then well rinsed with water and given into a dye bath of 100 ml. of water containing 0.4 gram of 2,5-dichloroquinone-1,4 which was well dispersed with the aid of 0.4 gram of a non-ionic alkyl polyglycol ether. The treatment is carried out at 70° C. for 45 minutes. A black dyeing is thus obtained which possesses good fastness properties.

In order to improve the fastness to rubbing the black dyeing is after-treated with 2 grams per litre of trisodium phosphate in combination with 1 gram per litre of sodium hydrosulphite and 1 gram per litre of a non-ionic alkyl polyglycol ether at 50° C. for 20 minutes.

In place of the condensation product from 4-amino-diphenylamine and the reaction product from sodium bisulphite and formaldehyde which is used in this example there may also be employed such products which are obtainable by heating reaction products of sodium bisulphite and formaldehyde with the following amines: 4 - amino-3'-methyl-sulphonyl-6'-methoxy-diphenylamine, 4-amino-4'-methyl-mercapto-diphenylamine, 4-amino-3'-nitro-diphenylamine, 4 - amino - 4'-acetamino-diphenylamine, 4 - isopropylamino-diphenylamine, 4 - amino-N-methyl-diphenylamine, 4-amino-4'-methyl-diphenylamine.

*Example 5*

25 grams of polyacrylonitrile fibers are introduced into a bath of 1000 ml. of water containing 2 grams of the aminodiphenylamine reaction product described in Example 4, and the dyeing continued at the boil for one hour. After an intermediate rinsing the dyeing is developed by treating it in an aqueous bath with 1.2 grams of finely dispersed 1-N-chloroimino-benzoquinone-anil-4 during 30 minutes at boiling temperature. A black dyeing with very good fastness properties is thus obtained.

If the process of this example is applied to the dyeing of polyvinyl chloride fibre likewise black dyeings of good fastness properties are obtained.

The fastness to rubbing may be improved by after-treating the dyed fabric in a bath containing in 200 ml. of water 0.6 gram of trisodium phosphate, 0.2 gram of sodium hydrosulphite and 0.2 gram of a non-ionic alkyl polyglycol ether at 70° C. for 20 minutes.

In place of the condensation product from 4-amino-diphenylamine and the reaction product from sodium bisulphite and formaldehyde which is used in this example there may also be employed such products which are obtainable by heating reaction products of sodium bisulphite and formaldehyde with the following amines: 4-amino-4'-methylsulphonyl-diphenylamine, 4-amino-4'-phenylsulphonyl-diphenylamine, 4 - amino-2'-phenylsulphonyl-diphenylamine, 4 - amino-3-methylsulphonyl-diphenylamine, 4-amino-4'-dimethylamino-diphenylamine, N,N' - bis - (4 - aminophenyl)-4,4'-diaminodiphenylether, N,N'-bis-(4-aminophenyl)-4,4'-diaminostilbene, N,N'-bis-(4 - aminophenyl)-4,4'-diamino-3,3'-dimethoxy-diphenyl, N,N' - bis-(4-aminophenyl)-4,4'-diaminodiphenylmethane, 4-amino-4'-cyclohexyl-diphenylamine.

*Example 6*

5 grams of cellulose triacetate fibre are introduced into a bath of 200 ml. of water containing 0.25 gram of the aminodiphenylamine reaction product described in Example 4 and 1 gram of trichlorobenzene; the dyeing is continued at the boil for 60 minutes. The pre-dyed fibres are then well rinsed and subsequently developed in an aqueous bath of 200 ml. of water containing 0.5 gram of copper (II) sulphate, 0.2 gram of finely dispersed N,N'-dichloroquinone diamine-1,4 and 0.4 gram of a non-ionic alkyl polyglycol ether, at 100° C. for one hour. A deep black dyeing with good fastness properties is thus obtainable. The dyeing may be aftertreated as described in Example 5 in order to improve the rubbing fastness.

*Example 7*

0.6 gram of the aminodiphenylamine reaction product described in Example 4 are dissolved in 100 ml. of water, 0.1 gram of sodium sulphide added thereto and 5 grams of a polyethylene terephthalate fibre introduced into the dye bath and dyeing continued at 120° C. for one hour. After an intermediate rinsing the pre-dyed fibres are dissolved in an aqueous bath of 100 ml. containing 0.3 gram of the compound of the formula

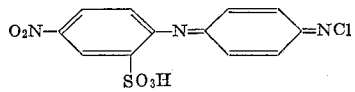

and 1 gram of salicyclic acid first at 90° C. for 20 minutes and then at 120° C. for furhter 20 minutes. A black dyeing with good fastness properties is thus being obtainable.

The fastness to rubbing can be improved by after-treatment with trisodium phosphate and hydrosulphite according to the method given in Example 4.

In place of the condensation product from 4-aminodiphenylamine and the reaction product from sodium bisulphite and formaldehyde which is used in this example there may also be employed such products which are obtainable by heating reaction products of sodium bisulphite and formaldehyde with the following amines: 4-amino-3-methoxy-4'-methyl-diphenylamine, 4-amino-2,4'-dichloro-diphenylamine, 4-amino-4'-fluoro-diphenylamine, 4-amino-3'-methyl-diphenylamine, 4-amino-4'-trifluoromethyl-diphenylamine, 4-amino-4'-carbomethoxy-diphenylamine, 4-amino-4'-carbophenoxy-diphenylamine, 4-amino-4'-phenoxy-diphenylamine, 4-amino-4'-hydroxydiphenylamine, 4-ethylamino-4'-methoxy-diphenylamine, N,N'-bis-(4'-aminophenyl)-1,5-naphthylene diamine, 4-amino-4'-hydroxybenzoyl-diphenylamine.

*Example 8*

10 grams of a polyethylene terephthalate fabric were introduced into a bath containing 200 ml. of water, 0.2 gram of sodium sulphide and 0.8 gram of the condensation product of 4-aminodiphenylamine, sodium bisulphite and formaldehyde. The fabric is pre-dyed in this bath for one hour at 120° C. After an intermediate rinsing the fabric is treated in a bath of 200 ml. of water containing 1 gram of hexachloro-cyclohexadienone in the presence of 0.4 gram of a non-ionic alkyl polyglycol ether at 120° C. within one hour.

Subsequently the fabric is after-treated as described in Example 5. A black dyeing having good fastness properties is thus being obtained.

*Example 9*

0.8 gram of the condensation product of 4-aminodiphenylamine, sodium bisulphite and formaldehyde is dissolved in 200 ml. of water, 0.2 gram of sodium sulphide and 1 gram of trichlorobenzene added and 10 grams of fibres from polyethylene terephthalate dyed therein at 100° C. within one and a half hour. After an intermediate rinsing the pre-dyed fibre is developed in an aqueous bath containing in 200 ml. of water 1 gram of heptachloro-cyclohexenone in the presence of 0.4 gram of a non-ionic alkyl polyglycol ether at 100° C. within one hour.

When the fibre is after-treated as described in Example 5 one obtains a black dyeing with good fastness properties.

We claim:

1. A process for coloring a hydrophobic fibrous material, which comprises:
   (A) applying to the fibrous material with a reaction product selected from the class consisting of (α) a condensation product of an amino group containing carbocyclic compound with an aliphatic aldehyde and (α₁) a condensation product of an amino group containing carbocyclic compound with a reaction product of an aliphatic aldehyde and alkali metal bisulfite, the amino group containing carbocyclic compound being selected from the class consisting of: 4-amino-diphenylamine, 4-amino-4'-methoxy-diphenylamine, 4-amino-2'-methoxy-diphenylamine, 1,8-diamino-naphthalene, 1-amino-4-phenyl-amino-naphthalene, benzidine, 4-aminonaphthalene-1,1'-azo-4'-aminobenzene, 4,4'-diamino-azobenzene, 3-methoxy-4-aminodiphenylamine, 4-amino-4'-naphthyl-diphenylamine, 4-amino-4'-cyclohexyl-diphenylamine, 4-amino-4'-methyl-diphenylamine, 2,4-diamino-diphenylamine, dianisidine, p-amino-phenylaminodiphenylamine, p-amino-phenylamino-diphenyloxide, m-phenylene diamine, 4-amino-2-chloro-4'-(N-dihydroxyethyl)-amino-1,1'-azobenzene, 4-benzoylamino-2,5-dimethoxy-1-amino-benzene, 4,4'-diaminostilbene, bis-(p-aminophenyl)-4,4'-diaminodiphenylamine, bis-(p-aminophenyl)-4,4'-diaminodiphenyloxide, bis-(p-aminophenyl)-4,4'-diamino-diphenylmethane, bis-(p-aminophenyl)-4,4'-diaminostilbene, bis-(p-aminophenyl)-4,4'-diamino-3,3'-dimethoxy-dephenyl, 4-amino-3-methoxy-4'-methyl-diphenylamine, 4-amino-2,4'-dichloro-diphenylamine, 4-amino-4'-fluoro-diphenylamine, 4-amino-3'-methyl-diphenylamine, 4-amino-4'-trifluoromethyl-diphenylamine, 4-amino-4'-carbomethoxy-diphenylamine, 4-amino-4'-carbophenoxy-diphenylamine, 4-amino-4'-phenoxy-diphenylamine, 4-amino-4'-hydroxydiphenylamine, 4-ethylamino-4'-methoxy-diphenylamine, N,N'-bis-(4'-aminophenyl)-1,5-naphthylene diamine, 4-amino-4'-hydroxy-benzoyl-diphenylamine, 4-amino-3'-methyl-sulphonyl-6'-methoxy-diphenylamine, 4-amino-4'-methyl-mercapto-diphenylamine, 4-amino-3'-nitro-diphenylamine, 4-amino-4'-acetamino-diphenylamine, 4-isopropylamino-diphenylamine, 4-amino-N-methyl-diphenylamine, 4-amino-4'-methylsulphonyl-diphenylamine, 4-amino-4'-phenylsulphonyl-diphenylamine, 4-amino-2'-phenylsulphonyl-diphenylamine, 4-amino-3-methylsulphonyl-diphenylamine, 4-amino-4'-dimethylamino-diphenylamine, 1-amino-4-(p-cyclohexylphenyl)-aminobenzene, and their salts:
   (B) applying in a second step to said fibrous material with a member selected from the class consisting of an N-haloquinone imine, an N,N'-dihaloquinone diimine, a cyclohexeneone of the formula

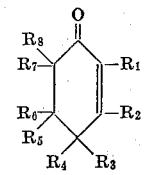

wherein $R_1$ to $R_8$ individually stand for a member selected from the class consisting of hydrogen and halogen, and $R_1$ and $R_2$ complete a fused benzene ring, and a cyclohexadienone of the formula

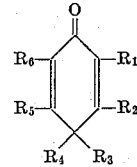

wherein $R_1$ to $R_6$ individually stand for a member selected from the class consisting of hydrogen and halogen, and $R_1$ and $R_2$ complete a fused benzene ring, and a quinone-anil-N-halogen imide.

2. The process of claim 1 wherein the hydrophobic fibrous material is polyethylene terephthalate.

3. The process of claim 1 wherein the amido group-containing carbocyclic compound is initially applied as a salt and the amine is liberated by the addition of an alkaline substance.

4. The process of claim 1 which incorporates a drying step between the two application steps.

5. The process of claim 1 wherein the application steps are carried out at a temperature from about room temperature to about 140° C.

6. The process of claim 1 wherein the temperature is adjusted to about 60° to about 140° C. after the two application steps have been completed.

7. The process of claim 1 wherein the amino group-containing carbocyclic compound is thermofixed at a temperature from about 200° to about 210° C. prior to the second application step.

8. The process of claim 1 wherein the amino group-containing carbocyclic compound is selected from the group consisting of 4-amino-4'-methoxydiphenylamine, 1-amino-4-phenylaminonaphthalene, 4,4'-diamino-azobenzene, 1-amino-4-(p-cyclohexylphenyl)-aminobenzene, 4-(p-aminophenyl)-amino-diphenyloxide, 4-amino-2'-methoxy-diphenylamine, 4-aminodiphenylamine, and their salts.

9. The process of claim 1 wherein a mixture of said amino group containing carbocyclic compounds is applied to the fibrous material.

10. The process of claim 1 wherein reducing means to prevent the oxidation of the amino group-containing carbocyclic compound is incorporated.

11. The process of claim 1 wherein the N-haloquinone is selected from the group consisting of

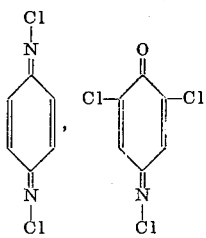

and

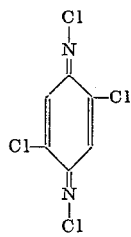

12. The process of claim 11 wherein the amino group-containing carbocyclic compound is selected from the group consisting of 4-amino-4'-methoxydiphenylamine, 1-amino-4-phenylaminonaphthalene, 4,4'-diamino-azobenzene, 1-amino-4-(p-cyclohexylphenyl)-amino-benzene, 4-(p-aminophenyl)-amino-diphenyloxide, 4-amino-2'-methoxy-diphenylamine, 4-aminodiphenylamine, and their salts.

13. The process of claim 1 wherein the said amino group-containing carbocyclic compound has the radical

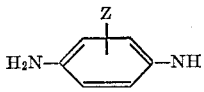

wherein Z stands for a member selected from the class consisting of hydrogen, —OCH₃, and —NH₂.

14. Process of claim 1 wherein the reaction product of the formula

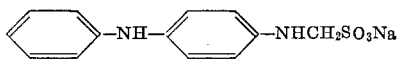

is applied in the first step, and thereafter N,N-dichloroquinone-imine of the formula

is applied in a second step.

15. Process of claim 1 wherein the reaction product of the formula

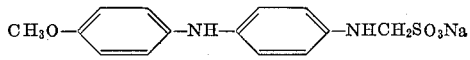

is applied in the first step, and thereafter N,N-dichloroquinone-imine of the formula

is applied in a second step.

16. Hydrophobic fibrous materials colored according to the process of claim 1.

17. Polyethylene terephthalate fibres colored by the process of claim 1.

References Cited by the Examiner

UNITED STATES PATENTS

| | | | |
|---|---|---|---|
| 2,086,337 | 7/1937 | Schirm | 8—39 |
| 2,926,060 | 2/1960 | Lehman | 8—32 X |
| 3,005,677 | 10/1961 | Weis | 8—32 |
| 3,036,875 | 5/1962 | Schlack | 8—55 |
| 3,058,797 | 10/1962 | Gies et al. | 8—1 |

FOREIGN PATENTS

| | | |
|---|---|---|
| 307,391 | 10/1955 | Japan. |
| 16,189 | 1907 | Great Britain. |
| 23,193 | 1904 | Great Britain. |

OTHER REFERENCES

Shinomiya et al.: Chem. Abst., 1958, vol. 52, column 737(d).

NORMAN G. TORCHIN, *Primary Examiner.*

J. HERBERT, *Assistant Examiner.*